United States Patent
Watson

[11] 3,713,721
[45] Jan. 30, 1973

[54] POLARIZED LIGHT BEAM SCANNING WITH IMPROVED ANGULAR RESOLUTION

[75] Inventor: William H. Watson, Roselle, Ill.
[73] Assignee: Zenith Radio Corporation, Chicago, Ill.
[22] Filed: Feb. 14, 1972
[21] Appl. No.: 225,744

[52] U.S. Cl..........350/150, 178/5.4 BD, 178/5.4 ES, 250/199, 350/161, 350/DIG. 2
[51] Int. Cl................................................G02f 1/26
[58] Field of Search......350/147, 149, 150, 157, 160, 350/161, DIG. 2; 178/DIG. 17, 5.4 BD, 5.4 ES; 250/199

[56] References Cited

UNITED STATES PATENTS 3,544,806  12/1970  De Maria et al......................350/161

Primary Examiner—David Schonberg
Assistant Examiner—Paul R. Miller
Attorney—John J. Pederson et al.

[57] ABSTRACT

A light beam scanning system has a Bragg acousto-optic deflector for dynamically deflecting an input beam through a predetermined scan angle. The system scan angle is caused to be greater than the scan angle of the acousto-optic deflector by the use of a static polarization-sensitive element, such as a Wollaston prism, and a polarization switch. The deflector transmits the beam in a first direction when the beam has a first polarization state and in a second direction when the beam has a second polarization state. The polarization switch switches the polarization of the beam from the first polarization state to the second polarization state. Control means synchronizes the acousto-optic deflector and polarization switch to cause the deflector to sweep the beam through its scan angle, initiating in the first direction when the beam has the said first polarization state and through its scan angle again, initiating in the said second direction, when the beam has the second polarization state. The system is depicted for use as a laser character generator. An associated method for enhancing the angular resolution of a light beam deflecting system is also disclosed.

8 Claims, 5 Drawing Figures

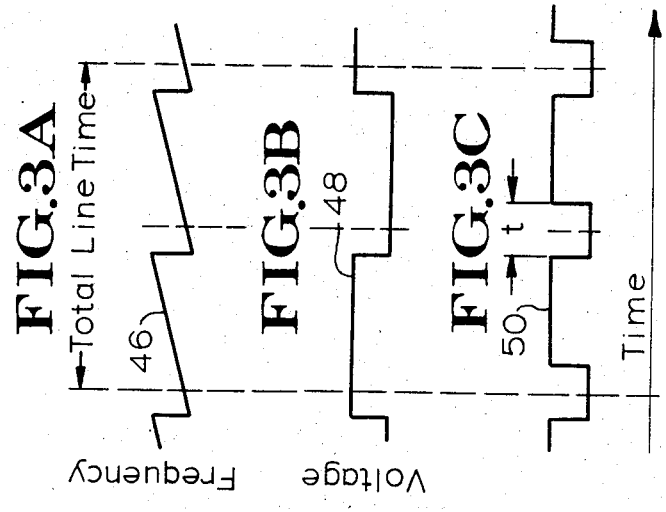
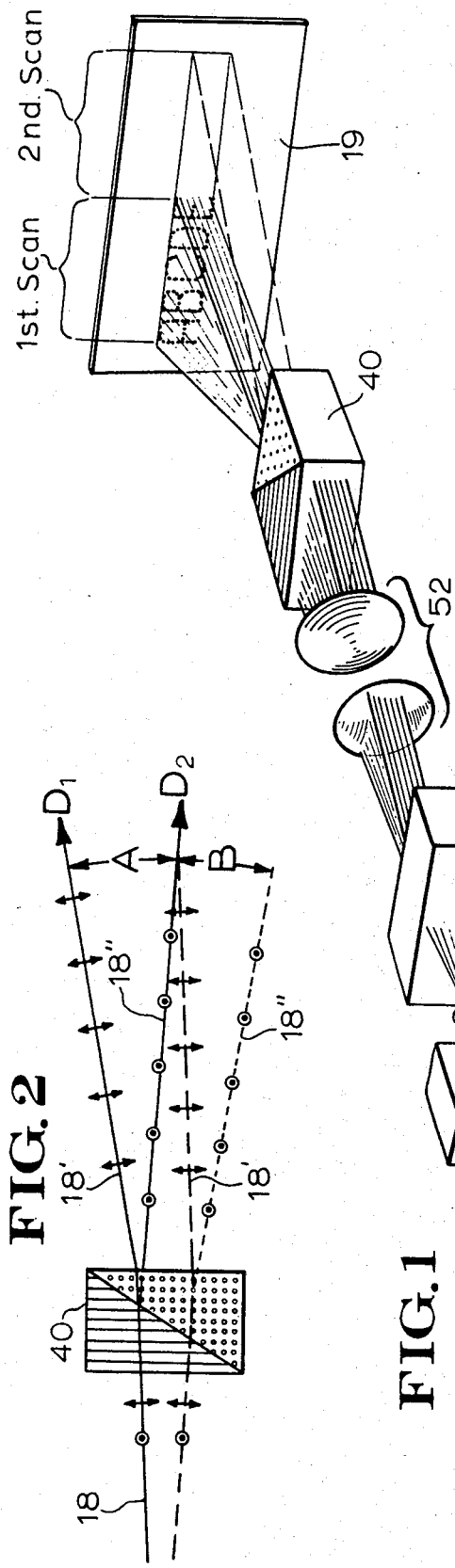
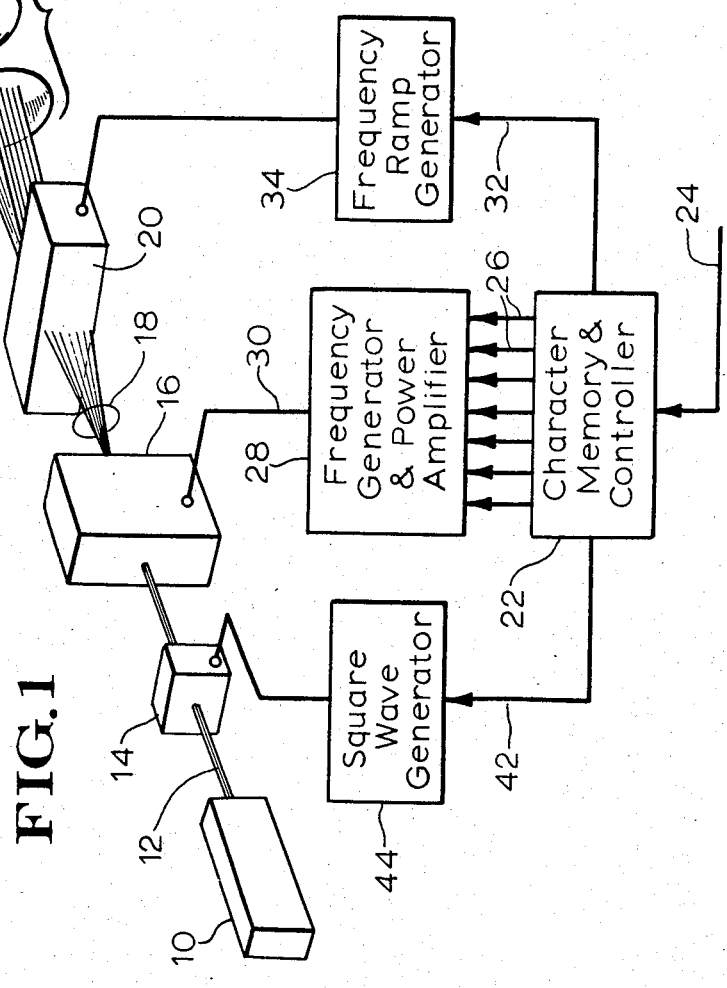

3,713,721

POLARIZED LIGHT BEAM SCANNING WITH IMPROVED ANGULAR RESOLUTION

BACKGROUND OF THE INVENTION

It is well known that acousto-optic light beam deflection systems, such as shown for example in the U.S. Pat. Nos. 3,373,380; 3,506,334; 3,424,906; 3,485,552; 3,493,759; 3,531,184; 3,590,157; and 3,055,258 have a relatively low angular resolution, i.e., a relatively small scan angle for a given beam diameter. However, there is known to exist a number of important applications for light beam deflection, especially for laser beam deflection, which require a relatively high angular resolution. For example, computer print-out is customarily done on the basis of 132 characters per line. Assuming a minimum character matrix of 5 × 7 elements, a line resolution of approximately 1,000 spots is required. No acoustic-optic beam deflector is yet available having 1,000 spot resolution.

OTHER PRIOR ART

"An Experimental Laser Color TV Projection System Compatible with NTSC Standard Color Signals," by Stone et al., *Display*, Vol. 6, No. 1 pp. 41–44, Jan./Feb. 1969.

OBJECTS OF THE INVENTION

It is a general object of this invention to provide systems and methods for increasing the angular resolution of light beam deflection systems, particularly beam deflection systems of the acousto-optic type employing a Bragg light-sound interaction cell, in order that the useful and advantageous properties and characteristics of such acousto-optic deflection systems may be employed in high resolution applications.

It is a particular object of this invention to provide a laser character generator which employs a Bragg acousto-optic beam deflection system and yet which has relatively high resolution capabilities.

It is another object to provide an improved method for increasing the effective angular resolution of a light beam deflection system.

BRIEF DESCRIPTION OF THE FIGURES

FIG. 1 is a highly schematic diagram of a laser beam deflection system embodying the principles of this invention;

FIG. 2 is a view of a polarization-sensitive prism constituting part of the FIG. 1 system, viewed from a different vantage point than in FIG. 1; and FIGS. 3A–3C illustrate various electrical waveforms generated in the FIG. 1 system.

DESCRIPTION OF THE PREFERRED EMBODIMENT

In a general sense this invention involves methods and systems for angularly scanning a beam of spatially coherent polarized electromagnetic radiation, for example a polarized laser beam, involving dynamically deflecting the beam through a predetermined scan angle, supplying the beam to a static polarization-sensitive means for transmitting the beam in the first direction when the beam has a first polarization state and in a second direction when the beam has a second polarization state. The polarization of the beam is switched from the first polarization state to the second polarization state in coordination with the dynamic deflection of the beam such that the beam is deflected through a total scan angle comprising two parts, a first part when the beam has the first polarization state and a second part when the beam has the second polarization state.

FIG. 1 illustrates very schematically a laser beam deflection system, more particularly a laser beam character generator, embodying the principles of this invention. The FIG. 1 system is illustrated as being adapted for use with a source of spatially coherent polarized light, here shown as a laser 10. The laser 10 generates a light beam 12 which is directed through a polarization switch 14, discussed in detail below, to an acousto-optic multiple-beam generator-modulator 16. The generator-modulator 16 includes a Bragg acousto-optic cell and a transducer coupled to the cell. As will be explained in more detail below, means are provided for supplying to the transducer a predetermined number of character information signals, here shown by way of example as seven, modulating seven frequency-separated carriers for producing in the cell seven modulated periodic sound wave trains which act to diffract the input light beam 12 into seven angularly separated, correspondingly modulated light beams 18. As will become evident from the following description, the light beams 18 may be used for recording or displaying characters at an output plane 19.

The fan of beams 18 is directed into dynamic light deflecting means 20 for causing the fan of beams 18 to be deflected through a predetermined scan angle. The beam deflecting means 20 is preferably a Bragg acousto-optic cell of a type described in detail in one or more of the above-mentioned patents. The beam deflecting means 20 causes the fan of beams 18 to be swept through a predetermined scan angle, as described in detail below.

A character memory and controller 22 receives an input 24, for example from a computer or a computer terminal device such as a paper tape reader, a magnetic tape reader, a keyboard, or the like, and generates a number of output signals 26 characterizing the modulation of the character elements needed to form the characters (seven in the illustrated embodiment). The output signals 26 are fed to a frequency generator and power amplifier 28 which generates seven carrier signals at spaced frequencies and modulates these carrier signals with the appropriate character element information. The signals are combined and fed through a line 30 to a transducer (not shown) on the multiple beam generator-modulator 16. As explained above, the character information signals are transduced to form seven trains of acoustic waves which act to diffract the incoming light beam into the seven beams 18.

The character memory and controller 22 also generates a sync pulse at twice the desired line rate which is fed through a line 32 to a frequency ramp generator 34. The frequency ramp generator 34 generates a continuous spectrum of frequencies, commonly termed a frequency ramp or "chirp" signal, which is fed to the beam deflecting means 20 to cause the fan of writing beams 18 to be swept in a direction perpendicular to the fan. FIG. 3A shows diagramatically the nature of the frequency ramp waveform generated.

As suggested above, whereas acousto-optic deflectors have a number of advantageous properties and characteristics, they do suffer from having limited angular resolution.

In order to effectively extend the scan of the beam deflecting means 20 for a given beam diameter, and thereby the angular resolution of the system, in accordance with this invention there is provided static polarization-sensitive means, here shown in the form of a Wollaston prism 40, for transmitting the beams 18 in a first direction when the beams have a first polarization state and in a second direction different from the first direction when the beams 18 have a second polarization state. The polarization switch 14 mentioned above is provided to switch the polarization of the beams 18 between the first and second polarization states.

FIG. 2 illustrates the operation of these two components of the system which represent essential components of this invention. In FIG. 2 the beams 18 where in a first polarization state, here shown as being linear with a horizontal orientation, as labeled 18'. The beams 18, where in a second polarization state which is linear but orthogonal to that shown at 18' (here shown as being in the system vertical direction) are designated 18".

The prism 40 that causes the beams 18 when in the first polarization state to be transmitted in an initial direction $D_1$. The dynamic beam deflecting means 20 causes the fan of beams 18' to be swept from the initial direction $D_1$ through a predetermined scan angle A. The prism 40 transmits the beams 18 when in the second polarization state in a direction $D_2$. From this initial direction $D_2$, the beam deflecting means 20 causes the beams 18" to be swept through a scan angle B.

The polarization switch 14 may be an electro-optic modulator of the well-known type employing a field-dependent anisotropic crystal which alters the state of polarization of a transmitted beam in proportion to the magnitude of the electrical potential established across the crystal. It is evident that by switching the state of polarization of the beams 19 from the horizontal to vertical linear polarization states, the initital direction of the light beams 18 is caused to alternate between a first direction $D_1$, and a second direction $D_2$. The first and second directions $D_1$, $D_2$ are caused to be in the plane of dynamic deflection of the beams 18 and to have an angular spacing which is at least as large as the scan angle of the beam deflecting means 20 such that the effective scan angle of the system is greater than the scan angle of the beam deflecting means 20.

In the illustrated embodiment, wherein a line of characters is desired to be generated as a composite of two line-parts without a gap in between or an overlap therebetween, it is desirable that the angular spacing of the first and second directions $D_1$, $D_2$ as established by the prism 40, be substantially equal to the scan angle A (or B) of the beam deflecting means 20. In this condition, the two line parts swept out by the beam deflecting means 20 are contiguous so as to develop a substantially continuous line of characters having twice the length of a line that could be generated by the beam deflecting means 20 alone.

Synchronizing means are preferably provided for synchronizing the switching means 14 and the beam deflecting means 20. To this end, the character memory and controller 22 is illustrated as developing a trigger signal which is fed through line 42 to a square wave generator 44. The square wave generator 44 develops a switching waveform, shown for example in FIG. 3B which drives the polarization switch 14 to cyclically rotate by 90° the polarization of the beam 12.

The frequency ramp waveform 46, shown in FIG. 3A is illustrated as being initiated before the generation of each partial line of characters. The reason for this is to allow a certain time period for the aperture of the acousto-optic beam deflecting means 20 to be filled by acoustic wave trains.

The square waveform developed by the electro-optic switching means 14, shown at 48 in FIG. 3C, is in phase with the frequency ramp waveform 46 in order to allow a time interval for damping of any signal ringing that might result immediately after switching takes place.

Waveform 50 shown in FIG. 3C illustrates the signal waveform for the composite character information signal supplied to the multiple beam generator-modulator 16, and can be considered to represent a character gating signal also. It can be seen that character information is fed to the multiple-beam generator-modulator 16 continuously except for a flyback interval $t$ during which the beam deflecting means 20 is retraced. The flyback interval $t$ is apportioned one-half at the beginning and one-half at the end of the line and is of sufficient magnitude to provide for a full aperture of deflection signals in the deflecting means 20 at the beginning and end of each line.

Because of the break in the flow of character information which must be introduced in order to allow for flyback of the beam deflecting means 20, in applications such as the present application wherein information is flowing into the system from a computer or other source of information at a steady rate, the controller 22 includes a buffer memory which stores information, here a line of characters. The character writing speed, as determined by the beam deflecting means 20, is caused to be sufficiently greater than the rate of information flow to the controller 22 to account for the flyback interval.

In the interest of simplifying the above description of this invention and its novelty and advantageous features, there has been omitted a disclosure of the necessary The desirable optics for beam expansion and modification, beam manipulation, output beam focusing, and the like, and of 6,328 ancillary structures which would be included beam a system as depicted.

A system as represented in FIG. 1 and having the components and specifications set forth below may be constructed to implement the principles of this invention. the laser 10 may be a commercially available helium neon laser producing 15 milliwatts of 6,328 A light and with a beam diameter of 1.1 mm. The beam 12 is preferably expanded before entering the modulator 16.

The multiple beam generator-modulator 16 may be an acousto-optic light modulator of a type which is commercially available having a 100 spot resolution, driven by a signal containing seven carrier frequencies evenly spaced from 30 to 50 MHz. The deflecting means 20 may be an acousto-optic light deflector also commercially available, having a 400 spot resolution, driven by a linear frequency ramp signal containing frequencies from 50 to 90 MHz, and with a deflection angle of 6.6 milliradians (measured in air outside the cell).

A character generating system as described, but using a manually controlled polarization rotator was successfully operated to generate lines of characters containing 130 or more characters, in 5 × 7 element matrix form, at rates in the order of tens of thousands of characters per second.

In accordance with an aspect of this invention, means are provided, here shown as a telescopic lens system 52 for causing the scan angle of the beam deflecting means 20 to match the deflection angle of the prism 40 (the angular separation of the first and second directions $D_1$, $D_2$). By way of example, a typical deflection angle for a commercially available Wollaston prism is 1°. If for example the scan angle produced by the beam deflecting means 20 is 6.6 milliradian, by the use of a telescopic lens system 52 having an appropriate magnification (approximately 2.6 in this example), the scan angle will be increased by a factor of approximately 2.6 to match the beam deflection angle of the prism, thus achieving contiguity of the line parts constituting the character line.

Whereas the invention has been shown in a character generator embodiment, numerous other applications of the invention are contemplated. For example, rather than using a Wollaston prism, a Rochan prism, Senarmont prism, another suitable polarization sensitive device may be employed. Polarization switching devices of other types than depicted could be employed. Rather than using a laser beam, other sources of spatially coherent light or non-visible radiation may be used. It is to be understood that the principles of this invention may be employed in connection with the extended deflection of a single spatially coherent beam, as well as with a fan of beams, as described. By the use of a buffer memory as described, a system substantially as described but using a single laser beam, rather than a fan of beams, could be rendered capable of displaying television images.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A beam deflection system for angularly scanning a beam of spatially coherent polarized electromagnetic radiation, comprising:
   dynamic beam deflecting means in the path of said beam including a Bragg acousto-optic cell and a frequency ramp generator for driving said cell, said beam deflecting means being capable of deflecting said beam through a predetermined scan angle;
   static polarization-sensitive means in said beam for directing said beam in a first direction when said beam has a first polarization state and in a second direction different from said first direction when said beam has a second polarization state;
   switching means for switching the polarization of said beam from said first polarization state to said second polarization state;
   control means for controlling said deflecting means and said switching means such that said deflecting means sweeps said beam through said scan angle, initiating in said first direction, when said beam has said first polarization state and through said scan angle, initiating in said second direction, when said beam has said second polarization state, said first and second directions being effectively in the plane of dynamic deflection of said beam and having an angular spacing which is related to said scan angle such that the total system scan angle swept out in one cycle of said switching means is greater than said scan angle of said dynamic beam deflecting means.

2. The system defined by claim 1 wherein said first and second polarization states represent orthogonal states of linear polarization, and wherein said polarization-sensitive means comprises a Wollaston prism.

3. The system defined by claim 1 wherein said angular separation of said first and second directions is substantially equal to said scan angle, whereby the scansions of said beam deflecting means when said beam has said different polarization states are substantially contiguous.

4. The system defined by claim 1 including telescopic lens means for causing said scan angle of said beam deflecting means to substantially match said angular spacing of said first and second directions, as determined by said polarization-sensitive means.

5. A character generator for use with a spatially coherent polarized light beam for successively sweeping out lines of characters, each composed of M vertical elements, comprising:
   a multiple beam generator in said light beam including a Bragg acousto-optic cell and means for supplying to said cell M character information signals modulating M frequency-separated carriers for producing in said cell M periodic sound wave trains respectively modulated by said information signals which act to diffract said input beam into M angularly separated, correspondingly modulated light beams;
   dynamic beam deflecting means in the path of said beams including a Bragg acousto-optic deflector and a frequency ramp generator for driving said deflector, said beam deflecting means being capable of deflecting said beams through a predetermined scan angle to develop N characters of predetermined horizontal element content;
   static polarization-sensitive means in said beams for directing said beams in a first direction when said beams have a first polarization state and in a second direction different from said first direction when said beams have a second polarization state;
   switching means for switching the polarization of said beams from said first polarization state to said second polarization state; and
   synchronizing means for switching said switching means in coordination with activation of said beam deflecting means to cause said beam deflecting means to make a first scansion of said beams, initiating in said first direction, while in said first polarization state and then a second scansion of said beams initiating in said second direction, while in said second polarization state, said first and second directions being effectively in the plane of dynamic deflection of said beams and having an angular spacing which is at least as large as said scan angle of said beam deflecting means such that said system develops a number of characters greater than N.

6. The system defined by claim 5 including telescopic lens means for causing said scan angle of said beam deflecting means to substantially match said angular spacing of said first and second directions, as determined by said polarization-sensitive means.

7. The system defined by claim 6 wherein said first and second polarization states represent orthogonal states of linear polarization, and wherein said static polarization-sensitive means comprises a Wollaston prism.

8. A method for angularly scanning a beam of spatially coherent polarized electromagnetic radiation, comprising:

dynamically deflecting said beam through a predetermined scan angle;

directing said beam through static polarization-sensitive means for directing said beam in a first direction when said beam has a first polarization state and in a second direction different from said first direction when said beam has a second polarization state;

switching the polarization of said beam from said first polarization state to said second polarization state in coordination with the dynamic deflection of said beam such that said beam is dynamically deflected through said scan angle, initiating in said first direction, when said beam has said first polarization state and through said scan angle, initiating in said second direction, when said beam has said second polarization state; and causing said first and second directions to be effectively in the plane of dynamic deflection of said beam and to have an angular spacing which is related to said scan angle such that the total scan angle swept out in one cycle of said switching means is greater than said scan angle developed during said dynamic deflection.

* * * * *